United States Patent [19]

Stockton

[11] 4,156,178
[45] May 22, 1979

[54] TERRESTRIAL MAGNETISM RESPONSIVE DEVICE INCLUDING A PAIR OF BALANCED NORTH SEEKING MAGNETS ROTATABLE ON A MAGNETIC AXIS

[76] Inventor: Raymond F. Stockton, 1780 Foothill Dr., Vista, Calif. 92083

[21] Appl. No.: 798,325

[22] Filed: May 19, 1977

[51] Int. Cl.² ............................................. G01V 3/08
[52] U.S. Cl. ......................................... 324/8; 33/364; 324/259
[58] Field of Search ............... 324/8, 14, 259; 33/346, 33/364, 355 R

[56] References Cited

U.S. PATENT DOCUMENTS

| | | | |
|---|---|---|---|
| 1,503,672 | 8/1924 | Thompson | 33/346 |
| 2,003,179 | 5/1935 | Faus | 33/355 X |
| 2,205,548 | 6/1940 | Volkmann | 33/364 X |
| 2,224,732 | 12/1940 | Kollsman | 33/346 |
| 2,437,132 | 3/1948 | Sinks | 324/259 X |
| 3,334,420 | 8/1967 | Stockton | 33/364 |
| 3,423,672 | 1/1969 | Stockton | 324/8 |

FOREIGN PATENT DOCUMENTS 7718 of 1911 United Kingdom ..................... 33/364

Primary Examiner—Gerard R. Strecker
Attorney, Agent, or Firm—Whann & McManigal

[57] ABSTRACT

A terrestrial magnetic responsive device having a float carrying magnetic north-seeking means and responsive not only to magnetic north, but also to local magnetic force fields, said device having a liquid evaporation and liquid movement control means.

2 Claims, 4 Drawing Figures

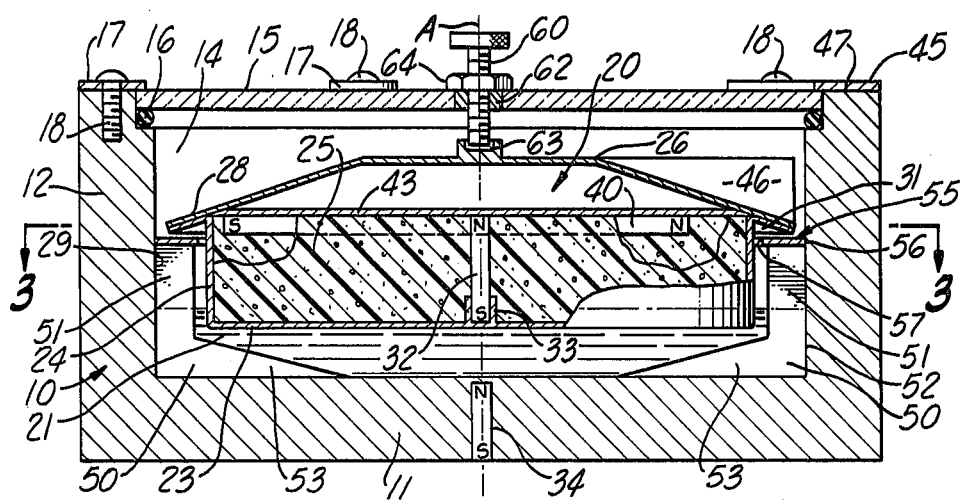
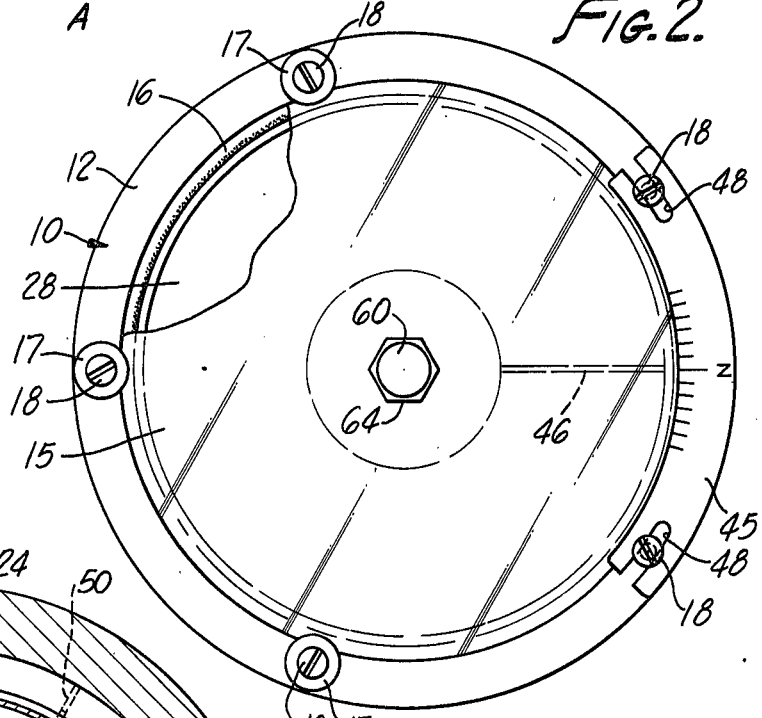
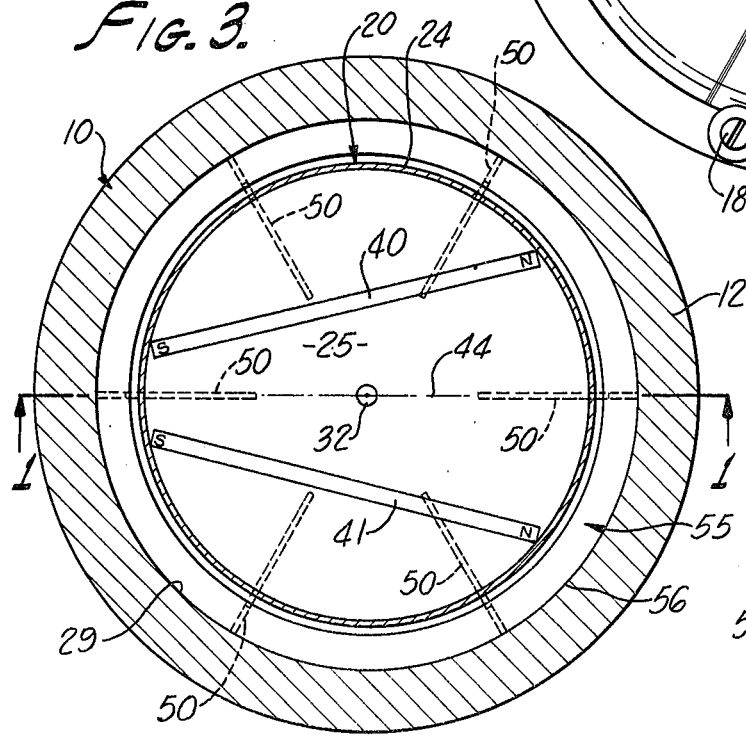
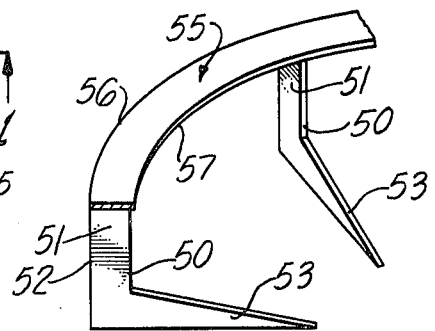

TERRESTRIAL MAGNETISM RESPONSIVE DEVICE INCLUDING A PAIR OF BALANCED NORTH SEEKING MAGNETS ROTATABLE ON A MAGNETIC AXIS

BACKGROUND OF THE INVENTION

Many earth formations give off radiations which are peculiar to the physical properties of the formations and considerable exploration is done with structures for measuring the radiated rays and local magnetic force fields produced by subsurface formations.

With a general knowledge of influencing physical properties, and with the measured magnetic variations, it is possible to predict the probable geological structure of the subsurface in a given locale.

DESCRIPTION OF THE PRIOR ART

There are numerous structures adapted to respond to localized magnetic force fields. The closest art known to applicant is the structure shown in his patent entitled Terrestrial Magnetism Responsive Device Including Fluid Supported Indicating Means for Investigating Subsurface Characteristics of the Earth, U.S. Pat. No. 3,423,672, issued Jan. 21, 1969.

SUMMARY OF THE INVENTION

It is the object of applicant's present invention to provide a terrestrial magnetic field responsive device which is superior in operation and which provides liquid movement and evaporation control means.

It is an object of applicant's invention to provide a combination in which the body of the device provides a chamber occupied by a float or indicator and in which there are an annular plate and vertical baffles, the annular plate being positioned around the float above the liquid level and the baffles projecting downwardly from the plate.

It is a further object of applicant's invention to provide a structure having the features referred to in the preceding paragraph in which the float has a wall which extends outwardly above the plate, these parts cooperating to reduce evaporation, particularly when change in temperatures occur.

It is also an object of applicant's invention to provide the float with a trap space above the plate wherein any vapors are trapped and not permitted to move upwardly to the top glass wall of the body, through which the pointer on the float is observed.

It is still a further object of the invention to provide a device of the character described in which the user of the device can hold the device in a horizontal position and look downwardly through a glass top of the body and observe the position of the pointer with respect to magnetic north.

Other objects and features of applicant's invention will be made evident in the course of the following detailed description of the preferred form of applicant's invention.

BRIEF DESCRIPTION OF THE DRAWINGS

Referring to the drawings:

FIG. 1 is a vertical cross-sectional view taken along the line 1—1 of FIG. 3;

FIG. 2 is a plan view of FIG. 1 partly broken away;

FIG. 3 is a cross-sectional view of FIG. 1 taken on line 3—3 of FIG. 1; and

FIG. 4 is a fragmentary perspective view of the plate and baffle means of the invention.

DESCRIPTION OF THE PREFERRED EMBODIMENTS

Referring to the drawings, there is a body 10 having a bottom wall 11 and a cylindrical wall 12 forming a float chamber 14. The body has a glass top 15 secured against a rubber sealing ring 16 by washers 17 held in place by screws 18.

In the chamber 14 is a float or indicator element 20 which floats on liquid 21 contained in the bottom of the float chamber 14.

The float has a horizontal bottom wall 23, a cylindrical wall 24, providing a chamber filled with plastic foam 25. The float has a top wall 26 which is frusto-conical, and has an outwardly projecting annular rim 28 which terminates a short distance within the annular surface 29 of the float chamber 14. Since the flange 28 projects downwardly it forms a vapor trap 31.

Applicant's invention provides magnetic means which forms the axis on which the float rotates. As shown in FIG. 1, there is a vertically positioned magnet 32 positioned on the axis A—A of the float and of the float chamber. The magnet is supported in the sleeve portion 33 which projects upwardly from the wall 23 and the north end of the magnet extends upwardly. In the bottom wall 11 of the body is a second magnet 34 which also is aligned on the axis A—A. Also, the North Pole is uppermost and is closest to the South Pole of the magnet 32.

Since the magnetic lines tend to shorten, the two magnets 32 and 34 are magnetically maintained on the vertical axis A—A, which holds the float in a central position and when the float rotates it rotates on the vertical axis A—A.

North-seeking magnets 40 and 41 are placed in a horizontal position just below the wall 43 of the float. They are held in position by being embedded in the plastic foam 25. The magnets 40 and 41 are of cylindrical cross-section and they are positioned on the opposite sides of a line 44 which extends diametrically through the axis A—A. The two magnets are spaced apart as shown. The South Poles are adjacent each other and the North Poles are adjacent each other. They are, however, not parallel, but at angles so that the North Poles are spaced further apart than the South Poles.

Each of the magnets 40 and 41 sets up its own magnetic field and these fields tend to cause each magnet to point to the north. However, the two fields and their magnetic pole balance each other with the result that with the north positioned as shown on the dial plate 45, the pointer 46, which is positioned on the diametrical line between the two magnets, will point to the magnetic North Pole, unless, of course, there are localized magnetic force fields.

The scale plate 45 is accurate and fits the upper end surface 47 of the cylindrical wall of the body. It has slots 48 through which screws 18 extend and the plate 45 is, therefore, adjustable. It will be noted that the plate 45 extends inwardly over the outer edge of the glass 15 and assists in holding it in place.

An important part of applicant's invention is the quieting and baffle means which reduce agitation in the liquid body 21 and reduces evaporation of the liquid comprising the liquid body. The baffle means comprises six baffles 50, positioned 60° apart and positioned on radial lines. The baffles include vertical portions 51 which have outer edges 52 which fit close to the cylindrical surface 29. The lower ends of the baffles have inwardly extending triangular portions 53 which extend toward the axial center line A—A. The function performed by these baffles is to keep the liquid quiet so that the float will remain as quiet as possible and thus obtain readings as accurate as possible.

At the upper ends of the baffles 50 is an annular plate 55 which is positioned in a horizontal plane and the outer edge 56 thereof engages a cylindrical surface 29 so that there is no space at that annular connection for vapor to arise into the upper part of the float chamber 14. The plate 55 is positioned above the liquid level and surrounds the float just below the annular flange 28. The plate has an inner edge 57 which is spaced a slight distance from the outer surface of the annular wall 24. This plate 55 and the flange 28 overlap each other. The plate 55 reduces evaporation and in combination with the flange 28 forms the trap which prevents vapor from moving upward into the upper part of the float chamber. Thus, it will be seen that this combination, motion control and evaporation-preventative element, assures that the float will not be agitated and thrown off of accurate reading and the upper chamber will be kept clear of moisture so that vision through the glass cover 15 is sharp.

The magnetic axis means holds the float centrally on the vertical axis A—A and the float does not move sidewardly and, therefore, does not contact the inner edge 57 of the plate 55.

While the apparatus is being carried from one location to another the retaining screw 60, shown in FIG. 1, which threads through a sleeve 62, is engaged in a socket 63 formed in the frusto-conical top 26. The screw 60 is held in position by the lock nut 64. The screw is lowered to hold the float from movement during shipping and when it is desired to put the device into use the lock nut 64 is loosened and the screw is raised so that the float is released and can move in response to the magnetic fields of the north-seeking magnets 40 and 41.

In the operation of applicant's invention the two north-seeking magnets 40 and 41 in setting up magnetic fields of substantially equal force, cause the float to assume a position in which the pointer 46 will point north. The device is adjusted so that the scale with its north graduation will line up with the pointer 46. This is done by loosening two screws 18 and shifting the plate 45 as required.

The device is moved to an area where it is suspected that there might be formations having physical properties which will set up local magnetic force fields. The device is held in an exactly horizontal position and is then moved over the area to be explored and the position of the pointer 46 is noted. Where the pointer 46 is moved from its normal position and no longer points north the diversions are noted and also the exact location where the test is being made is also noted and this information is turned over to engineers for analysis and a determination of whether or not exploratory operations should be performed at this particular location.

Wherever the term "north-seeking magnet or magnets" is used reference is made to magnetic north.

Applicant's invention is not limited to the exact preferred form as shown in the drawings, and the scope of applicant's patent protection is to be determined by the following appended claims.

I claim:

1. A terrestrial magnetism responsive device which reacts to local subsurface lines of magnetic force, comprising:
    (a) a body having a chamber containing a liquid;
    (b) a float in said chamber which floats on said liquid, said float having a pointer;
    (c) said float having a vertical central axis of rotation on which it is rotatable in said liquid;
    (d) a vertical cylindrical internal wall in said chamber surrounding said float and being spaced therefrom;
    (e) a horizontal annular plate in said chamber fitted on said wall and closely spaced from and surrounding said float, said plate being positioned above the surface of said liquid;
    (f) upright baffles positioned below and supporting said plate, said baffles being supported adjacent the chamber bottom in said liquid and being annularly spaced around said float;
    (g) said float having an annular flange projecting outwardly from its upper portion and extending over said plate and being closely spaced therefrom;
    (h) north-seeking magnets carried by said float;
    (i) said north-seeking magnets being spaced and horizontally positioned on opposite sides of a horizontal diametrical line extending through said axis of the float;
    (j) said north-seeking magnets providing balanced magnetic fields and each magnet normally tending to point north;
    (k) said pointer being spaced between said magnets so that the balanced fields of the magnets cause said pointer to normally point north; and
    (l) said magnets and their fields being responsive to local magnetic force fields to be indicated by said pointer as the float is rotated by the local fields.

2. A device as defined in claim 1, in which said baffles extend radially and are fixed to said plate.

* * * * *